(12) United States Patent
Ford

(10) Patent No.: US 7,252,269 B1
(45) Date of Patent: Aug. 7, 2007

(54) ASYMMETRICAL LOW-PROFILE BULKHEAD

(75) Inventor: Donald B. Ford, Huntsville, AL (US)

(73) Assignee: Maple Bridge, LLC, Huntsville, AL (US)

( * ) Notice: Subject to any disclaimer, the term of this patent is extended or adjusted under 35 U.S.C. 154(b) by 130 days.

(21) Appl. No.: 11/017,421

(22) Filed: Dec. 20, 2004

(51) Int. Cl.
*B64G 1/00* (2006.01)
(52) U.S. Cl. .................................................. 244/158.1
(58) Field of Classification Search ............ 244/135 R, 244/172.2, 172.3, 158.1, 171.1, 171.4; 220/901, 220/23.6, DIG. 13
See application file for complete search history.

(56) References Cited

U.S. PATENT DOCUMENTS

| | | | | |
|---|---|---|---|---|
| 1,222,867 A * | 4/1917 | Hogg | ........................... | 114/78 |
| 2,519,968 A * | 8/1950 | Jordan | ........................ | 137/266 |
| 2,858,136 A * | 10/1958 | Rind | ........................... | 280/832 |
| 3,043,542 A * | 7/1962 | Neuschotz | .............. | 244/135 R |
| 3,058,421 A | 10/1962 | Stein | | |
| 3,096,054 A * | 7/1963 | Ciminaghi | .............. | 244/135 R |
| 3,202,381 A | 8/1965 | Wuenscher | | |
| 3,238,664 A * | 3/1966 | McDonald | ................... | 446/32 |
| 3,246,394 A | 4/1966 | Meyer | | |
| 3,304,724 A * | 2/1967 | Blumrich et al. | ............. | 60/257 |
| 3,409,714 A * | 11/1968 | Strugar, Jr. | ................. | 264/242 |
| 3,712,502 A | 1/1973 | Basier et al. | | |
| 3,955,784 A * | 5/1976 | Salkeld | .................... | 244/171.1 |
| 4,151,829 A * | 5/1979 | Wilson | ....................... | 126/683 |
| 4,247,012 A * | 1/1981 | Alberghini | ................. | 215/373 |
| 4,374,478 A * | 2/1983 | Secord et al. | ............ | 73/863.31 |
| 4,615,452 A | 10/1986 | Lederer et al. | | |
| 4,723,736 A * | 2/1988 | Rider | ....................... | 244/171.1 |
| 4,807,833 A * | 2/1989 | Pori | ........................ | 244/159.6 |
| 5,085,343 A | 2/1992 | Scarr | | |
| 5,141,181 A * | 8/1992 | Leonard | .................. | 244/172.2 |
| 5,383,566 A * | 1/1995 | Johnson | ....................... | 220/562 |
| 5,678,726 A * | 10/1997 | Porteous | ..................... | 220/676 |
| 5,758,795 A | 6/1998 | Johnson | | |
| 5,927,653 A | 7/1999 | Mueller et al. | | |
| 5,944,215 A | 8/1999 | Orlowski | | |
| 5,961,074 A * | 10/1999 | Dunn | ..................... | 244/135 R |
| 6,036,144 A * | 3/2000 | Sisk | ........................ | 244/171.1 |
| 6,113,032 A * | 9/2000 | Cochran et al. | ......... | 244/135 R |
| 6,123,295 A * | 9/2000 | Wexler et al. | ........... | 244/172.3 |
| 6,231,009 B1 * | 5/2001 | Kong | ..................... | 244/135 R |
| 6,422,514 B1 | 7/2002 | Clark et al. | | |
| 6,491,259 B1 * | 12/2002 | Kirn et al. | ............... | 244/171.1 |
| 6,499,287 B1 * | 12/2002 | Taylor | ........................ | 60/204 |
| 6,685,141 B2 * | 2/2004 | Penn | ........................ | 244/171.1 |
| 6,745,983 B2 * | 6/2004 | Taylor | .................... | 244/135 R |
| 7,093,337 B1 * | 8/2006 | Taylor | ........................ | 29/469 |

(Continued)

Primary Examiner—Robert P. Swiatek
Assistant Examiner—Stephen A. Holzen
(74) Attorney, Agent, or Firm—Mark Clodfelter

(57) ABSTRACT

An asymmetrical bulkhead for a pressure vessel, tank or other storage facility is disclosed. The bulkhead is configured so that there is a high region extending past a cylindrical portion of the vessel on one side of the bulkhead, with a contour of the bulkhead transitioning from the high region to a low region within the last cylindrical region. Such a bulkhead configuration allows two cylindrical pressure vessels to be nested together in end-to-end relation so as to occupy a total smaller volume than similarly sized vessels having convex ends, or to construct pressure vessels that contain a larger volume for storage than similarly sized vessels having convex ends.

20 Claims, 9 Drawing Sheets

U.S. PATENT DOCUMENTS

| | | | |
|---|---|---|---|
| 7,108,285 B2* | 9/2006 | Stobart | 280/838 |
| 2002/0139901 A1* | 10/2002 | Penn | 244/162 |
| 2003/0093987 A1* | 5/2003 | Taylor | 60/257 |
| 2004/0118855 A1* | 6/2004 | Calabro | 220/560.08 |
| 2004/0207192 A1* | 10/2004 | Stobart | 280/838 |
| 2005/0178916 A1* | 8/2005 | Howe | 244/135 R |

* cited by examiner

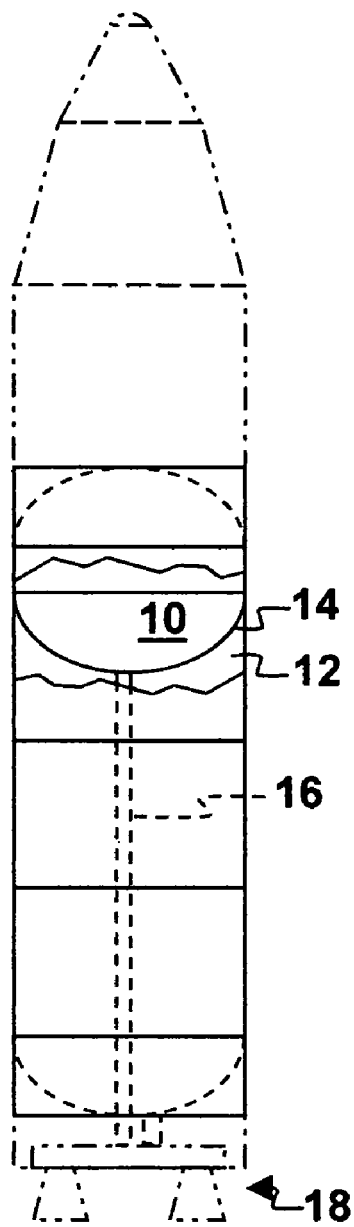
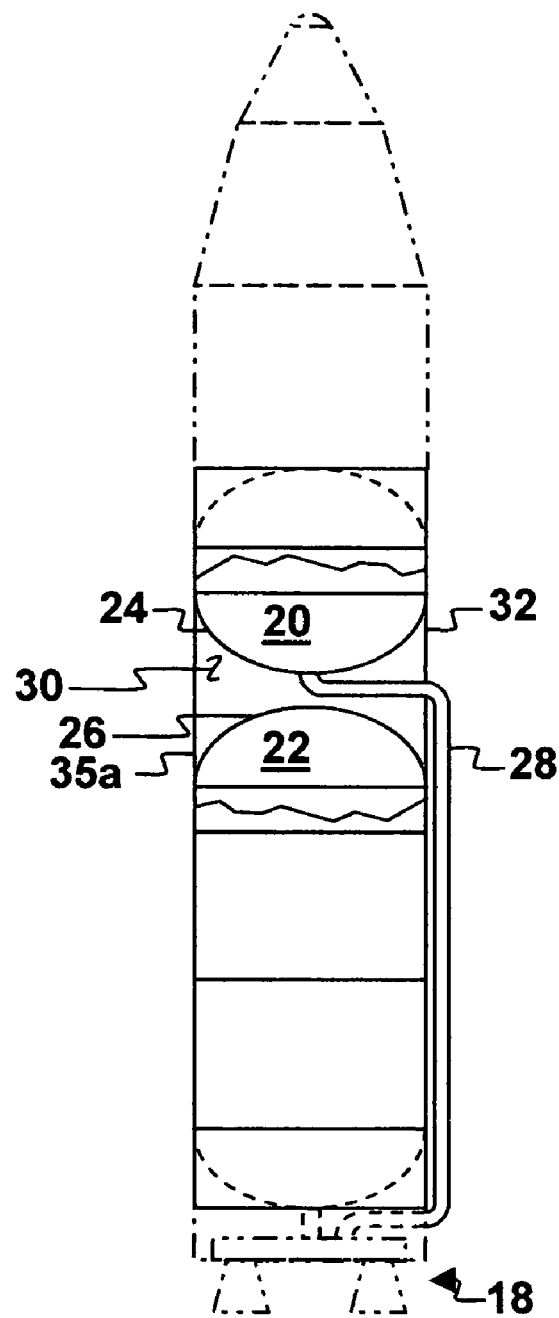
FIG. 1
PRIOR ART
FIG. 1a
PRIOR ART

ASYMMETRICAL LOW-PROFILE BULKHEAD

STATEMENT REGARDING FEDERALLY SPONSORED R & D

This invention was developed using government resources, resulting in the government having a nonexclusive, nontransferable, irrevocable, paid-up license to practice the invention or have the invention practiced throughout the world by or on behalf of the United States government.

FIELD OF THE INVENTION

This invention relates generally to containers whose contents apply pressure to walls of the container, and particularly to non-symmetrical bulkheads for storage vessels.

BACKGROUND OF THE INVENTION

Many types of pressure vessels are known, such as for tanker trucks, LPG tanker ships, spacecraft propellant tanks, fire extinguishers and many others. With the exception of some designs of spacecraft propellant tanks, virtually all are constructed having a cylindrical body, with a concave or convex cap or bulkhead at each end. In some designs, the bulkhead may be flat, although this design is inherently the most structurally inefficient and requires heavier and thicker bulkheads than concave or convex bulkheads. Typically, conical, hemispherical and elliptical bulkheads are used, although for upright applications additional structure is required to maintain a vertical orientation.

With respect to liquid-fueled spacecraft, typical designs, such as found in the Space Shuttle, and referring to the prior art drawings of FIGS. 1, 1a incorporate fuel and oxidizer tanks having either round or cylindrical bodies, with bulkheads of adjacent ends of tanks being either of rounded or elliptical configurations. While these rounded or elliptical configurations are strong and allow for lighter tanks, rounded and elliptical configurations for such bulkheads are inefficient with respect to volume in adjacent bulkhead areas, and allow for a relatively large vortex to form when fuel is drawn from a natural low point in the bulkhead. Development of such a large vortex requires maintenance of a relatively large fuel residual to be left in the tank to avoid gas or vapor from being drawn into one or more engines of the spacecraft.

In some designs that have been considered, a common bulkhead is used between oxidizer and propellant tank sections. However, in these designs it is usually necessary to route fuel tubing from an upper tank through a lower tank to a rocket engine. This creates manufacturing problems due to the necessity that tanks and interior tubing be fabricated integrally. In addition, if a defect is found in one tank section then the entire assembly must be scrapped or reworked. Further, common or nested bulkhead tank systems do not lend themselves well to fabrication methods where there is an assembly-line type procedure for fabrication of a number of identical oxidizer and propellant tanks, such as found in the Space Shuttle program, In accordance with the foregoing, Applicant proposes asymmetrical tank bulkhead designs that overcome the aforementioned problems, as will become apparent from a reading of the following specification.

BRIEF DESCRIPTION OF THE DRAWINGS

FIGS. 1 and 1a are prior art diagrammatic representations illustrating how conventional propellant and oxidizer tanks and their bulkheads are incorporated into spacecraft housings.

DETAILED DESCRIPTION OF THE DRAWINGS

Figure 2:
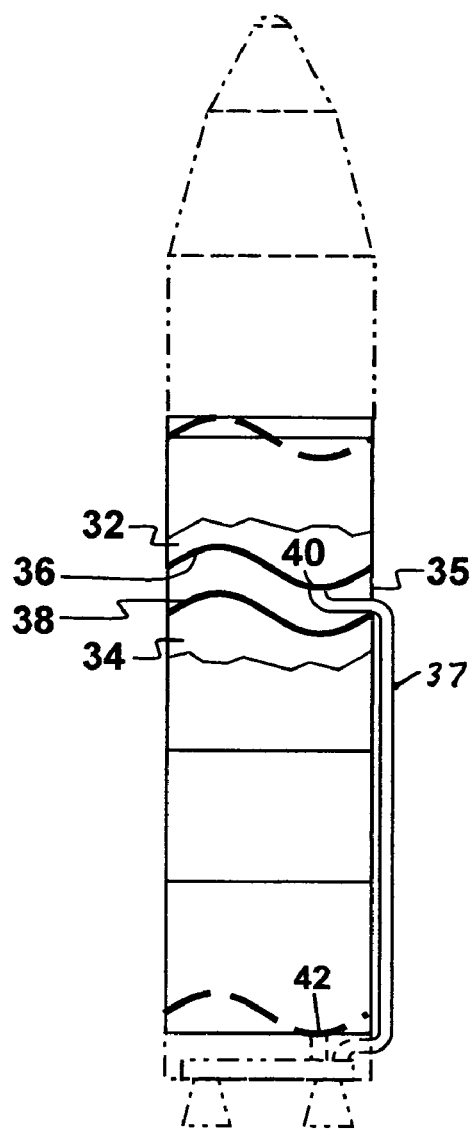
FIGS. 2, 2a, 2b, 2c and 2d are diagrammatic representations of several embodiments of Applicant's proposed propellant and oxidizer tank bulkheads.

Referring initially to FIGS. 1 and 2, prior art representations of spacecraft pressure tanks for fuel and oxidizer are shown, with the intertank skirt region between the tanks shown cut away for clarity. In FIG. 1, an upper tank 10 and a lower tank 12 are provided with a hemispherical or elliptical common or nested bulkhead 14. As shown, this design requires a tube or pipe 16 to penetrate lower tank 12 in order to convey material from tank 10 to rocket motors 18. As described above, this design is difficult to manufacture and presents problems when fabrication is undertaken in an assembly-line type process.

FIG. 1a shows a more conventional approach, also with the intertank skirt cut away for clarity, and which is implemented in the external tank of the Space Shuttle program. Here, liquid oxygen and liquid hydrogen tanks 20, 22 are provided with rounded bulkheads 24, 26, with a pipe 28 exiting a bottom of tank 20 to rocket motors 18. Also as described above, while being of strong construction, the rounded bulkheads 24, 26 create wasted space within volume 30 between the bulkheads and within the intertank skirt or enclosure 32 enclosing ends of tanks 20, 22. In addition, the wide rounded area of lower bulkhead 24 of upper tank 20 and a similar rounded area at a bottom of tank 22 create areas within which large vortexes in the liquid of the tank may form. As noted above, such a configuration requires a relatively large quantity of fuel to be left in the tank in order to prevent gasses from reaching an engine.

Referring now to FIG. 2, a bulkhead system as proposed by Applicant is diagramatically shown, also with the intertank skirt cut away. Here, an upper fuel or oxidizer tank 32 and a lower fuel or oxidizer tank 34 are provided with bulkheads 36, 38 respectively. As shown, configuration of bulkheads 36, 38 is such that they are asymmetrical, and in a spaced-apart, fitted relation wherein low and high points of the lower tank are directly beneath low and high points of the upper tank. This fitted relationship allows more fuel capacity for each of tanks 32, 34 than in the prior art tanks of FIG. 1a wherein the lengths of the respective tanks are the same. In addition, natural low points 40, 42 are formed in each lower bulkhead of the respective tanks, these low points surrounded by an asymmetrical region of a smaller area or volume of the tank, resulting in more usable fuel and oxidizer being available to the engines before a vortex in the fuel forms. As stated, such a vortex would allow gas or bubbles to be drawn into one or more of the rocket engines, possibly damaging the engine. Further, tanks 32, 34 are separate, discrete tanks separately constructed and supported within the structure of the spacecraft, and thus may be fabricated using independent assembly-line techniques, one for each tank. Further yet, using asymmetrical bulkheads, additional weight savings are realized due to less unpressurized structure in the intertank region as opposed to conventional domed bulkheads. In other words, an intertank skirt portion 35 (FIG. 2) interfacing two tanks with fitted asymmetrical bulkheads, and associated support structure for the asymmetrical tanks (not shown) is of a smaller mass than a corresponding skirt portion 35a (FIG. 1a) and associated support structure interfacing tanks with domed bulkheads. A fuel line 37 (FIG. 2) may be routed horizontally or at a slight downward angle from natural low point 40 in upper tank 32 to the rocket engines.

Figure 2A:
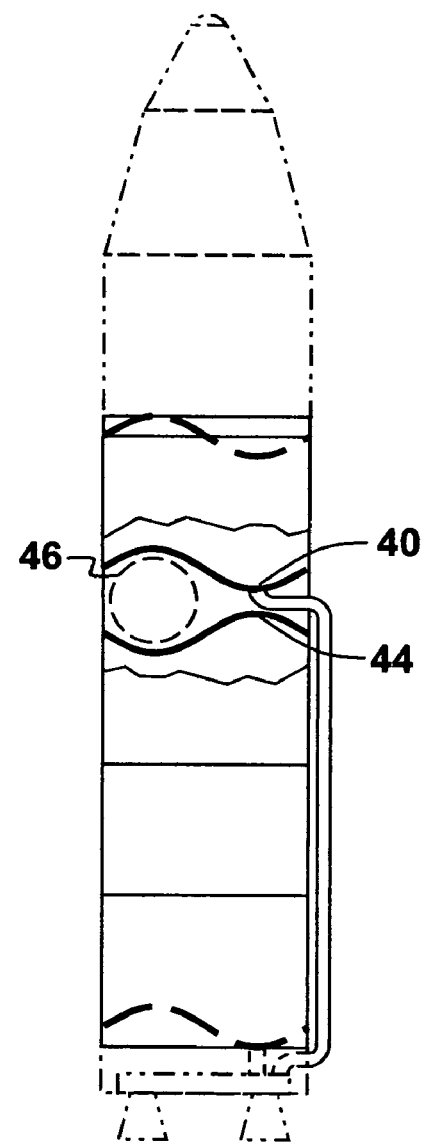

FIG. 2a shows tanks having Applicant's bulkheads rotated so that natural low point 40 is above a natural high point 44 of the lower tank. While making for a slightly longer overall structure, this design allows accommodation of a smaller, third tank 46 (dashed lines) that may be used to contain a pressurizing agent for the propellant tanks. Alternately, the volume within which tank 46 is fitted may be used for other purposes, such as avionics package or other cargo or payload.

Figure 2B:
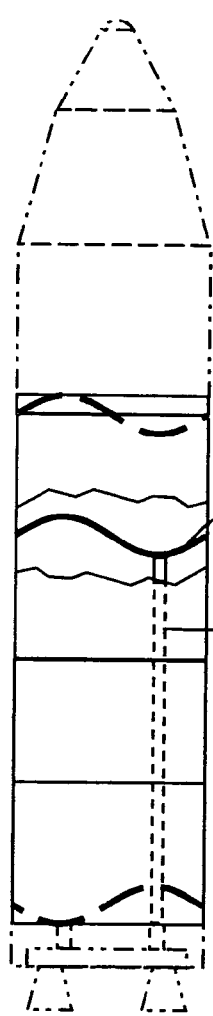

FIG. 2b shows a common bulkhead design wherein a common, asymmetrical bulkhead 48 separates an upper tank from a lower tank. A propellant line 50 from the natural low point in the upper tank is routed through the lower tank to convey fuel to the rocket engines. While such a design incurs the aforementioned problems, it has the advantage of making more fuel available to the engines due to restricting size of a vortex as described above.

Figure 2C:
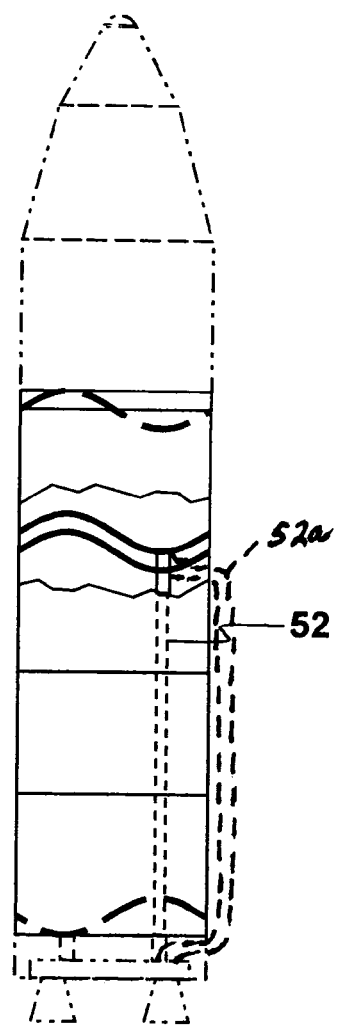

FIG. 2c shows upper and lower tanks with Applicant's asymmetrical bulkheads in a closely fitted relation, meaning that the tanks, while not touching each other or a common intermediate layer of a structural material, such as a honeycomb material, are sufficiently close to each other so as to minimize space, and thus to intertank support mass, between the tanks. This design has the advantage of reducing unpressurized mass of the spacecraft. As shown, a fuel line 52 may be routed from a natural low point in the upper tank through the lower tank to the rocket engines. Alternately, as shown by dashed lines in FIG. 2c, a recess may be provided in the upper bulkhead of the lower tank to facilitate routing the fuel line horizontally or at a slight downward angle.

Figure 2D:
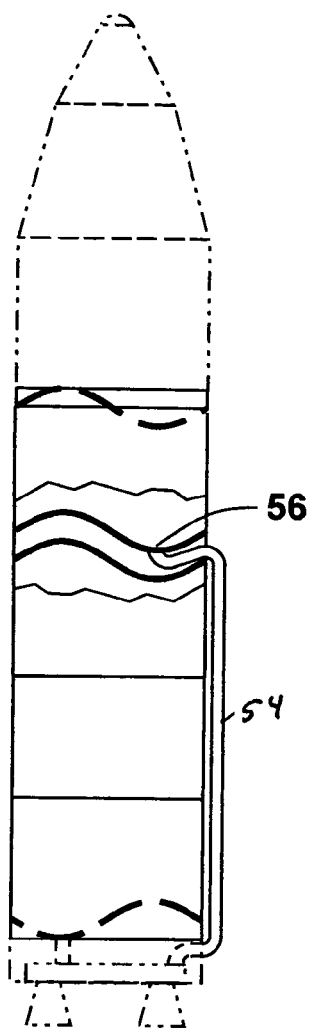

Referring to FIG. 2d, a fuel line 54 from a closely fitted upper tank is shown as being at a slight upward inclination from natural low point 56 to accommodate the generally upwardly extending region between tanks 32 and 34. In general, such upward inclinations of fuel or oxidizer lines are somewhat undesirable due to vapor becoming trapped in the line during refueling and prior to firing the engines. As stated, inclinations may be avoided by simply providing a recessed region, as shown in FIG. 2c, in the upper bulkhead of the lower tank where a propellant line may be routed horizontally or inclined slightly downward. In other instances, slightly more space may be provided between the tanks so that the line may be routed horizontally, as shown in FIG. 2, or at a slight downward angle although such a design would increase slightly unpressurized mass of the spacecraft. This latter embodiment, in conjunction with Applicant's bulkheads of the instant invention, still provides more volume for fuel/oxidizer in their respective tanks of a like length than tanks using conventional domed bulkheads. Alternately, a small vent may be located at a high point of the upwardly inclined fuel line in order to vent gasses that may accumulate in the highest point of the line prior to firing the engines.

Figure 3:
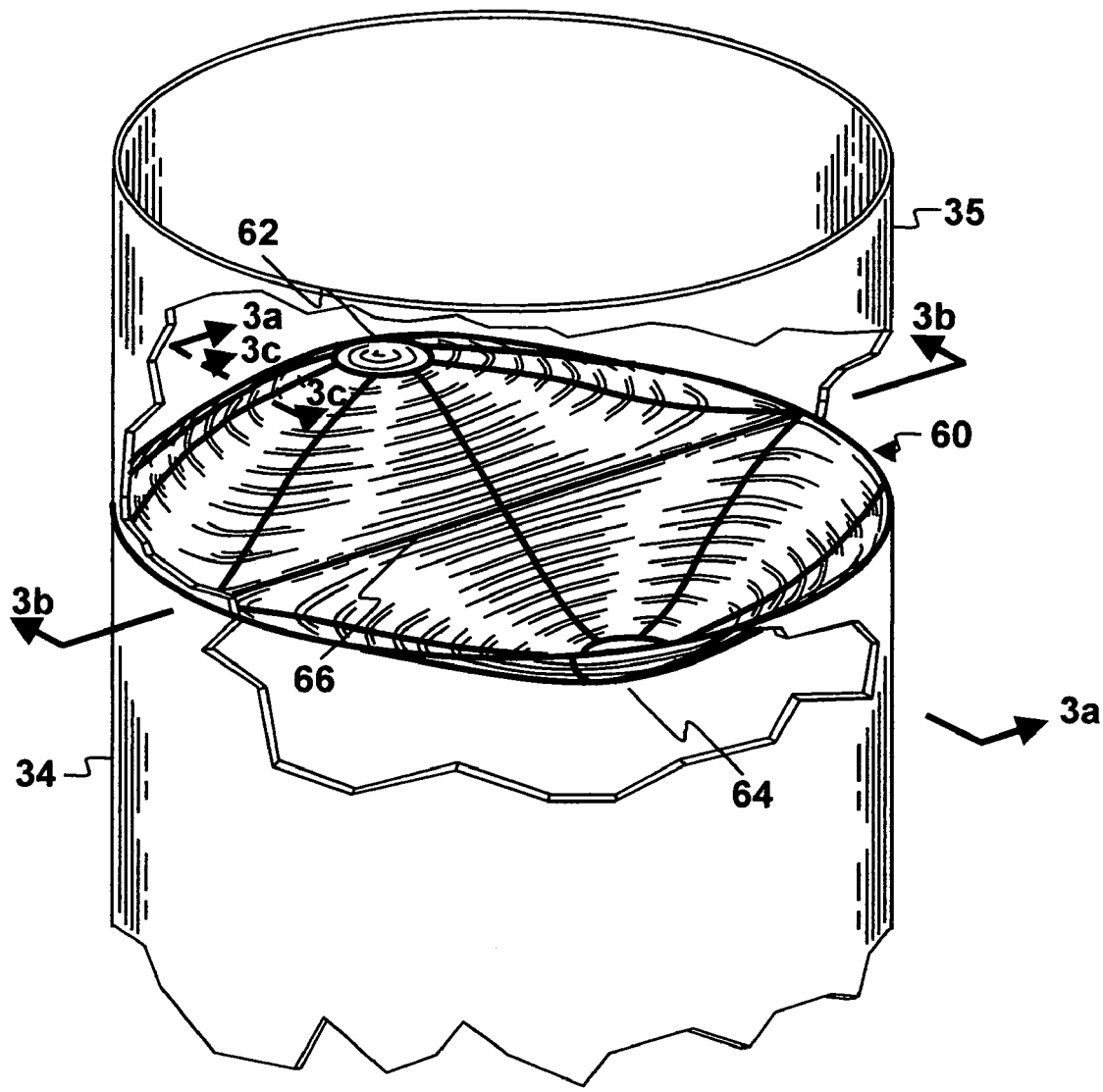
FIG. 3 is a perspective view showing contour lines of a tank or pressure vessel using a bulkhead of the instant invention.

Referring now to FIG. 3, one example of an asymmetrical bulkhead 60 of the instant invention is shown. Here, it is apparent from shaded contour lines that one side of the circular bulkhead 60 is convex in configuration up to a high point 62, which is outside the bounds of cylindrical tank 34, with the other side of the bulkhead being concave to a low point 64 within the bounds of cylindrical tank 34. A transition region generally around line 66 between the convex and concave regions, in this embodiment, is essentially straight or flat.

Figure 3A:
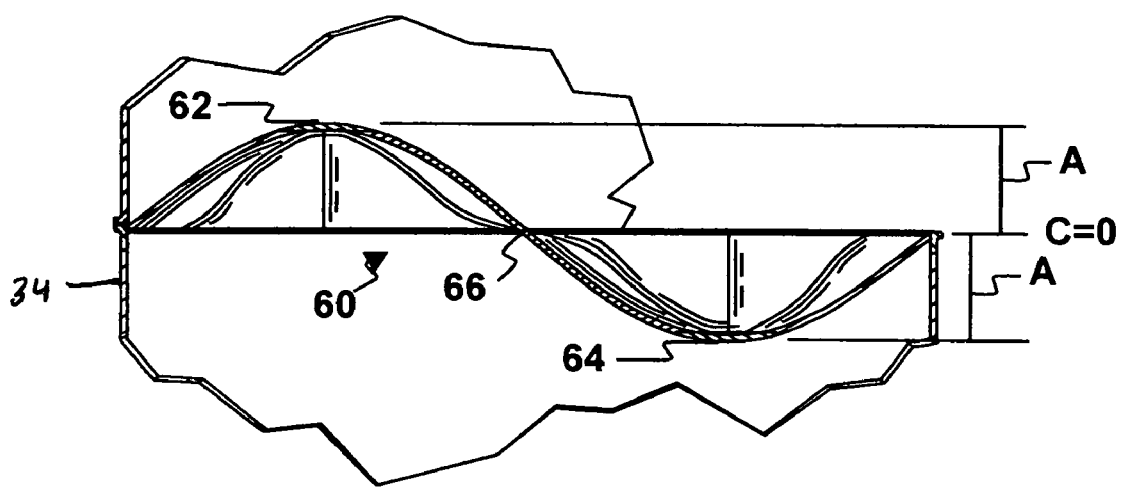
FIGS. 3a, 3b and 3c are sectional views taken along lines 3a-3a, 3b-3b and 3c-3c of FIG. 3.

FIG. 3a illustrates the asymmetrical bulkhead wherein the convex portion and concave portion thereof are based on an elliptical arc, with the transition region 66 being straight or flat as described. As shown, a high point 62 of the convex portion of bulkhead 60 extends above tank 34 while a low point 64 of the concave portion of bulkhead 60 extends downward into tank 34. With a volume of the concave portion approximately equal to a volume of the convex portion, it is seen that the combined volume of the convex portion and the concave portion is about the same as the volume would otherwise be with a flat bulkhead. However, unlike a flat bulkhead, Applicant's asymmetrical bulkhead takes advantage of the strengths of both concave and convex bulkheads without the extra mass required for a flat bulkhead.

Figure 3B:
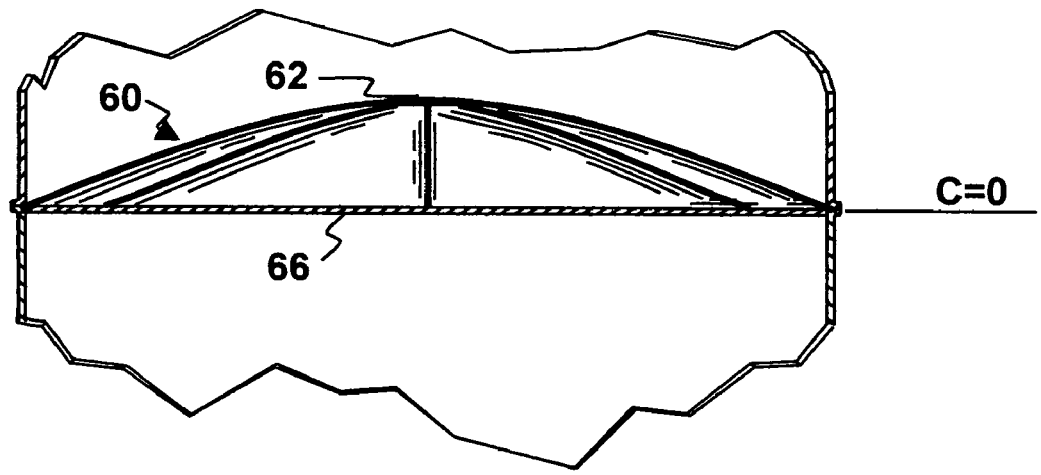

FIG. 3b shows an upwardly extending convex region of the bulkhead based on an elliptical arc, along with the generally flat transition region 66.

Figure 3C:
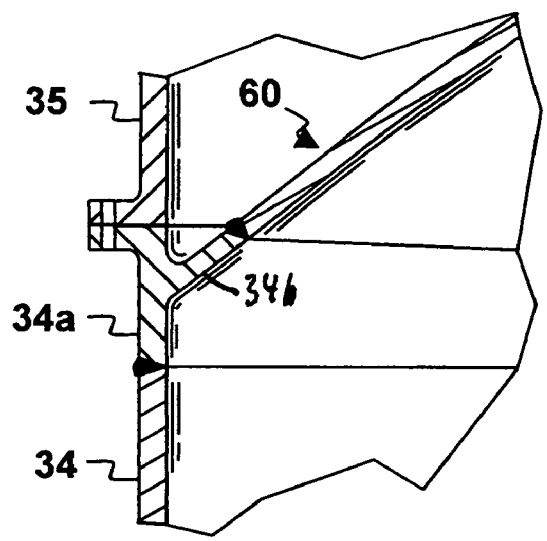
Figure 3D:
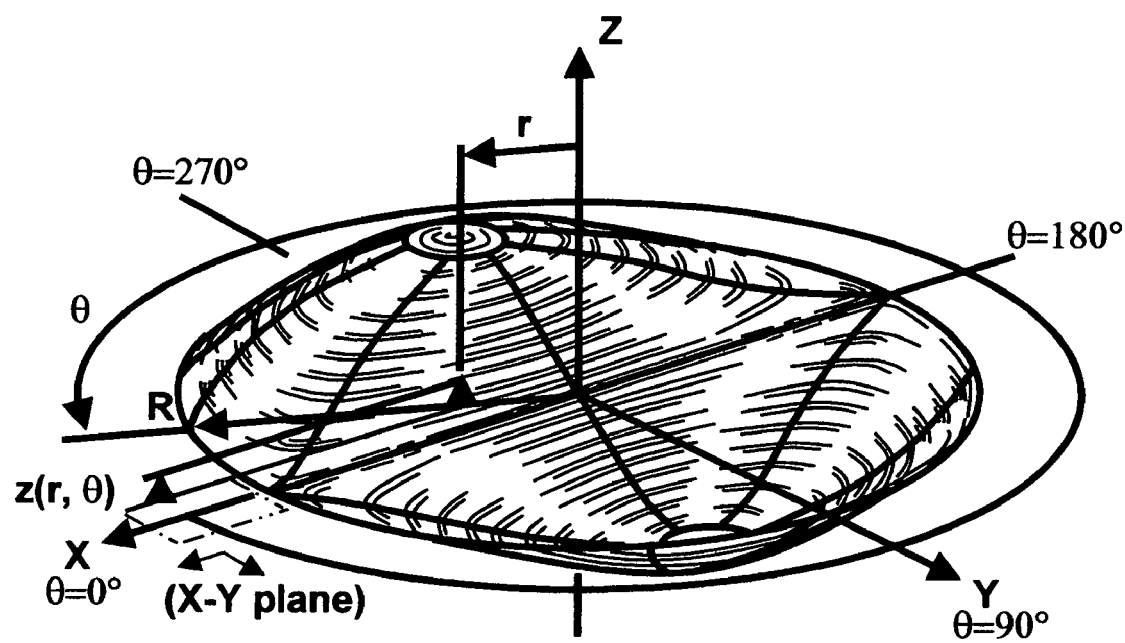
FIG. 3d maps the $z(r, \theta)$ surface.

FIG. 3c shows details of how Applicant's bulkhead may be conventionally attached to a cylindrical tank. Typically, for the liquid hydrogen tank 34 (FIG. 2), Applicant's bulkhead 60 is welded, as by friction stir welding, as indicated by the dark welded area, to an interface ring 34a provided with a flange or the like for affixing the ring 34a to intertank skirt 35. Here, skirt 35 may be attached to the flange by fasteners or by welding. Interface ring 34a is attached to the cylindrical portion of tank 34, also by welding, as indicated by the dark welded area. Since Applicant's bulkhead forms a circular plane about its periphery, a conventional interface ring 34 may be used to interface Applicant's asymmetrical bulkhead to a tank. Typically, where dome flange 34b is angled to match an angle of the bulkhead and welded by a butt joint to bulkhead 60, as shown in FIG. 3c, the dome flange 34b of ring 34a is angled to generally match an angle of Applicant's bulkhead.

Figure 4:
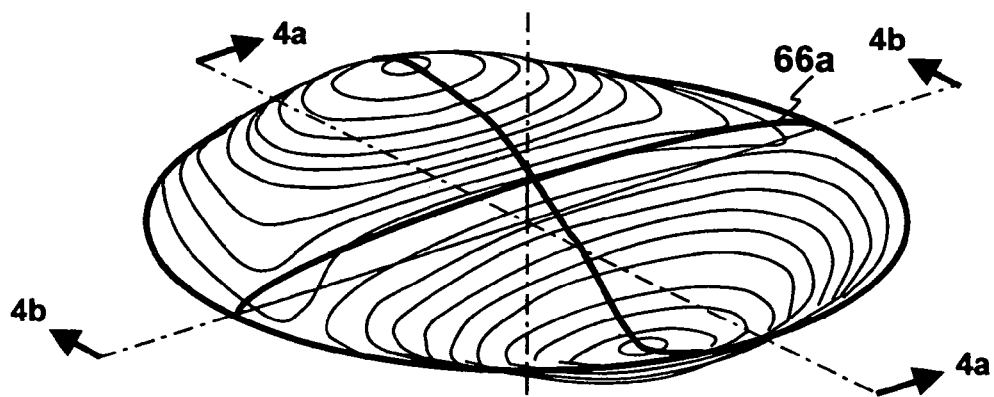
FIG. 4 is a diagrammatic view of another embodiment of my new bulkhead.
Figure 4A:
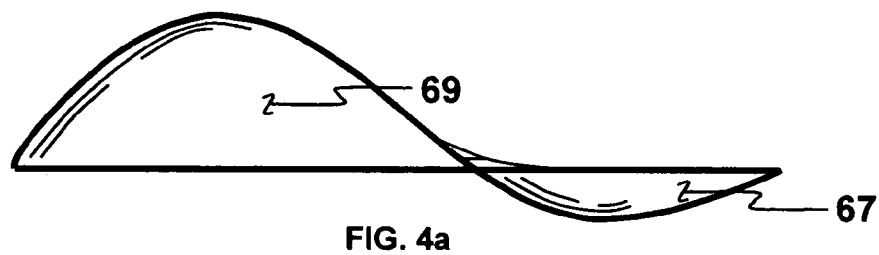
FIGS. 4a and 4b are sectional views taken along lines 4a-4a and 4b-4b of FIG. 4.
Figure 4B:
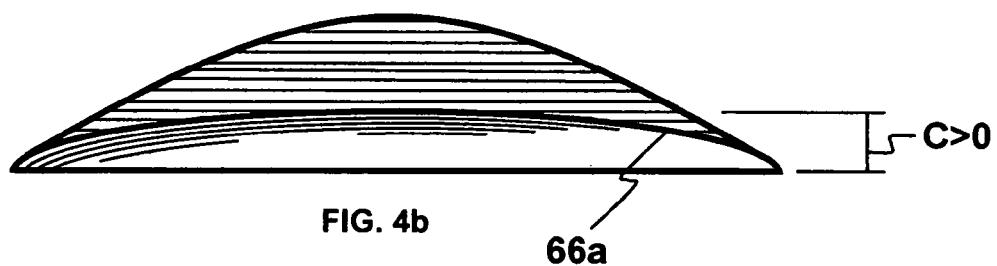
Figure 4C:
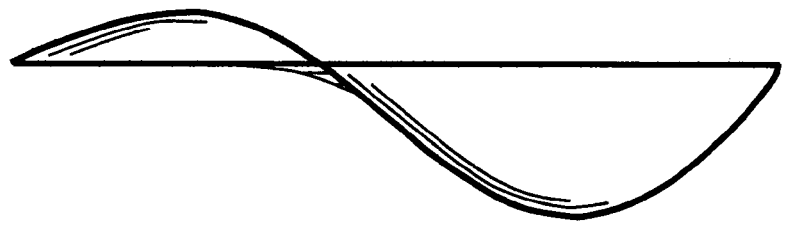
FIGS. 4c and 4d are sectional views similar to FIGS. 4a and 4b showing another embodiment of my new bulkhead.

FIG. 4 shows a bulkhead of Applicant's design based on convex and concave elliptical arcs, with transition region 66a curved upward for additional strength, also shown in FIG. 4b. The transition region may also be curved downward for additional strength, as shown by transition region 66b in FIG. 4d. As shown in FIG. 4a, the upwardly extending convex region 69 is of a greater volume than the downwardly extending concave region 67. In this embodiment, the volume of such a bulkhead can still be made to be equal to or greater than the volume of a flat bulkhead due to the increased volume of upwardly extending convex region 69, although such a bulkhead may be reversed, as shown in FIG. 4c so that a greater volume is in the downwardly extending portion. Where the lesser volume convex region 67 is used at a bottom of a propellant or oxidizer tank (FIG. 4a), the low point formed thereby generates an even smaller vortex than a bulkhead of Applicant's design having equal concave and convex regions, allowing more fuel/oxidizer to be made available to the engines.

Figure 4D:
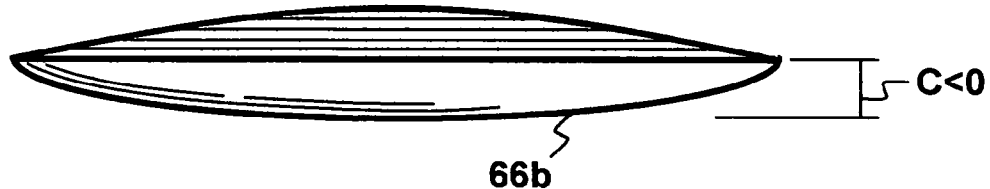

The asymmetric bulkhead concept embodies alternate geometric variations. The cylindrical configuration shown in FIGS. 3 and 4 is defined by the general equation:

$$z(r,\theta)=A[\sin(\theta)*\sin(180+180*r/R)]+[a(r/R)^4+b(r/R)^2+C]$$

where $\theta$ is in degrees and terms $\theta$, $r$, $R$, and $z$ are defined by conventional coordinates. As such, "$\theta$" is the angle defined by the reference axes centered on the origin: "$r$" is the independent radial measurement; "$R$" is the outer parameter of the bulkhead; and "$z$" is the dependent variable, a function of "$\theta$" and "$r$", for the height of the bulkhead measured parallel to the longitudinal axis "$Z$". The Z-axis passes through the origin. The first group $z(r, \theta)=A[\sin(\theta)*\sin(180+180*r/R)]$ defines a sinusoidal pattern within amplitude A. The second group $[a(r/R)^4+b(r/R)^2+C]$ superimposes an additional convex curvature of some height C where $(a+b+C)=0$. Such a design is shown in FIGS. 3a, 3b where amplitude A is the same in both positive and negative directions, with $a=b=C=0$. The origin is defined by the center of the bulkhead. The additional convex curvature term provides an initial curvature that may be advantageous in some design cases, but may be set to 0 where a section view through the high and low points of Applicant's bulkhead is sinusoidal, as shown in FIG. 3. The additional convex curvature term could also be replaced with a different geometric feature, such as an ellipsoidal contour, as shown in FIG. 4. More terms can be added depending on particular design requirements. For instance, FIG. 4b shows a case where C is greater than 0, and FIG. 4d shows a case where C is less than 0.

Figure 5:
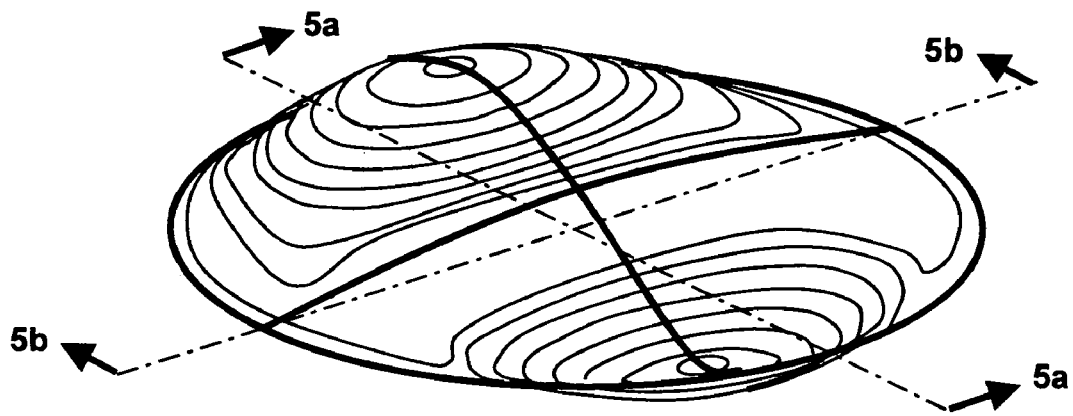
FIG. 5 is a perspective view of yet another embodiment of my new bulkhead.
Figure 5A:
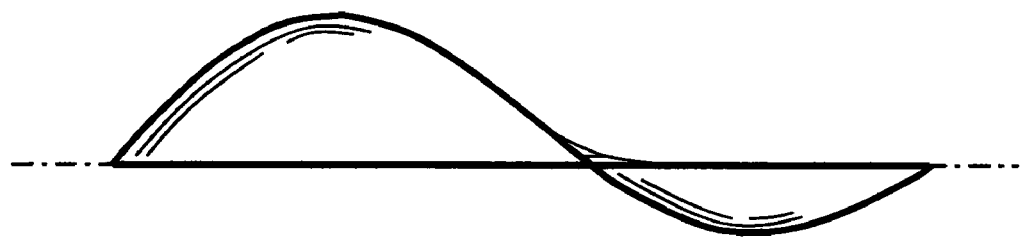
FIGS. 5a and 5b are sectional views taken along lines 5a-5a and 5b-5b of FIG. 5.
Figure 5B:
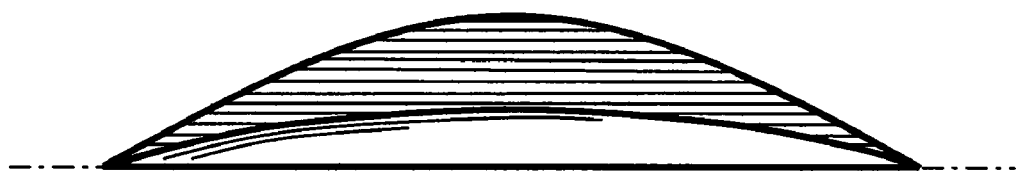

FIG. 5 shows another embodiment of Applicant's bulkhead wherein the convex and concave regions are based on circular arcs. The convex and concave regions may be equal, as shown in FIG. 3a, or may be unequal, as shown in FIG. 5a. Here, the larger region may extend upward, as shown in FIG. 5a, or downward, as shown in FIG. 4c. Further, the transition region may be curved upward as described, as shown in FIG. 5b, or downward as described and shown in FIG. 4d.

Figure 6:
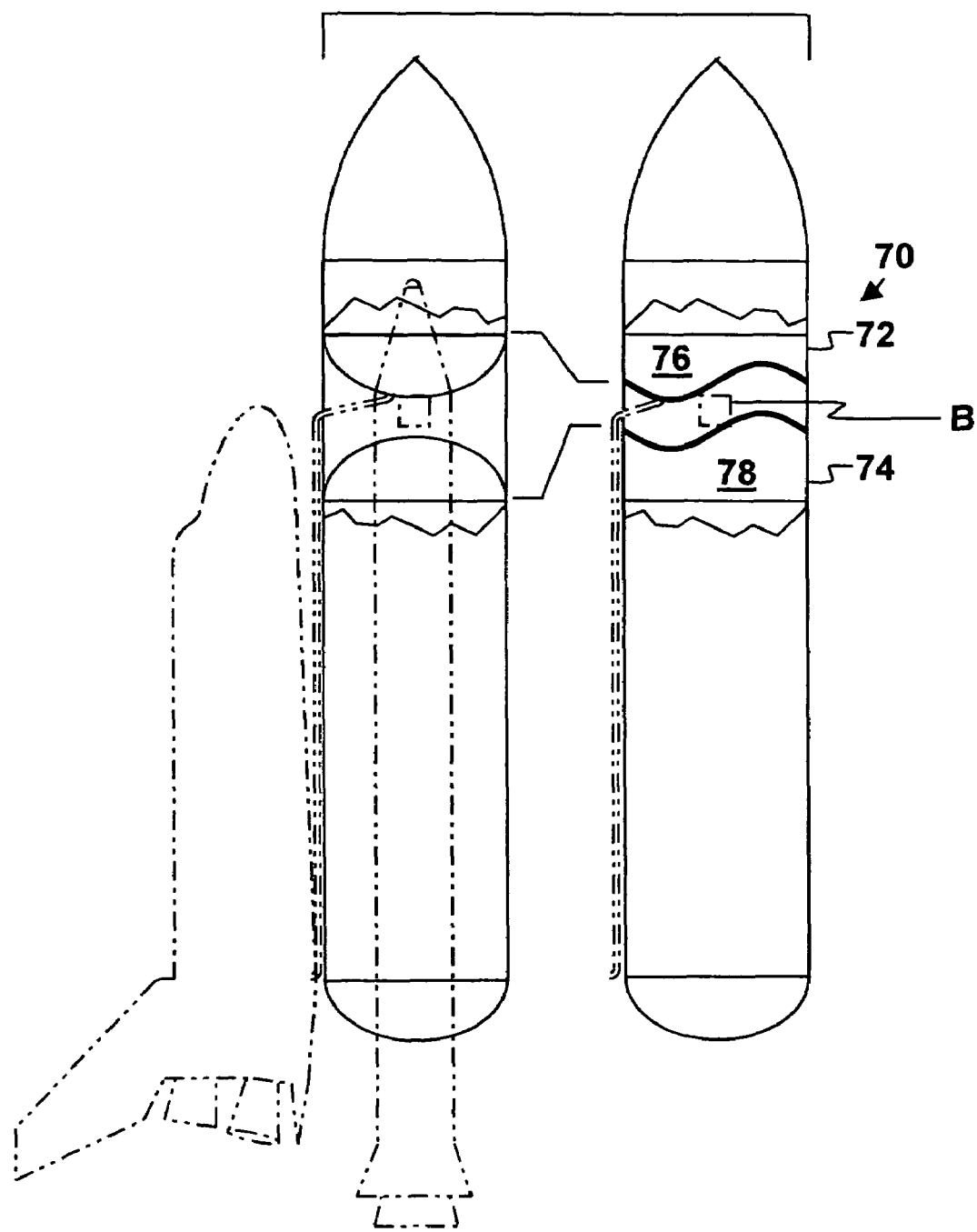
FIG. 6 is an illustration comparing an original design of the Space Shuttle external tank to a design of the external tank using Applicant's bulkheads.

Referring now to FIG. 6, the Space Shuttle external tank is used as one example of an asymmetric bulkhead design. Here, shape of the external tank 70 is held constant, eliminating need to run additional wind tunnel experiments. As can be seen, an additional cylindrical barrel section 72 may be added to liquid hydrogen tank 76 and an additional cylindrical barrel section 74 may be added to liquid oxygen tank 78. Position of the solid rocket booster crossbeam support B is unchanged. With the advantages of the asymmetrical bulkheads as described above, an additional 3.4 percent combined volume for the tanks is realized.

One of the parameters to be considered in modifying the Space Shuttle external tank is that a longer barrel section is needed for the liquid hydrogen tank than the additional barrel section for the liquid oxygen tank in order to maintain a stoichiometric propellant ratio. With this in mind, and referring to Table 1, it is seen that a 1.7 percent increase of both liquid oxygen and liquid hydrogen is easily achievable.

TABLE 1

| Propellant Tank | Volume (cubic meter) | Fluid Volume (liter) | Mass (kg) |
|---|---|---|---|
| ET LH2 Tank | 1492 | 1492000 | 105400 |
| Additional LH2 | 25 | 25000 | 1800 |
| LH2 subtotal | 1517 | 1517000 | 107200 |
| % increase | | 1.7% | |
| ET LO2 Tank | 539 | 539000 | 703100 |
| Additional LO2 | 9 | 9000 | 12000 |
| LO2 subtotal | 548 | 548000 | 715100 |
| % increase | | 1.7% | |
| ET subtotal | 2031 | 2031000 | 808500 |
| Additional subtotal | 35 | 35000 | 13800 |
| Total ET | 2031 | 2031000 | 822300 |
| % increase | | 1.7% | |

This benefit of extra fuel is manifested in several ways. Additional propellant allows the Space Shuttle to carry a heavier payload, obtain a higher altitude orbit, achieve orbit with a comparable payload from a different inclination or operate the engines longer at a lower power setting, thus applying less strain to the engines. In a different engine with a larger main combustion chamber throat, a higher propellant flowrate may be enabled.

The relation between payload mass, altitude, and inclination are interdependent. Here, inclination refers to a location from which the Space Shuttle (or any other spacecraft) is launched, with the equator of Earth and an orbit above the equator being 0 degrees inclination and each of the poles being 90 degrees inclination. In a preliminary study, mass of the external tank was held constant. Rather than assume any weight savings by using Applicant's asymmetrical bulkheads as described above, reduction in structural mass due to a smaller intertank interface is redistributed into the propellant tanks and bulkheads. Assuming mass of the external tank remains the same, additional propellant alone allows approximately 1,800 kilograms of additional payload to be injected into an elliptical transfer orbit. With a gain of 4 kilometers with every 100 kilograms less of payload, an altitude increase of 74 kilometers can be obtained rather than carrying the additional 1,800 kilograms of payload. Alternatively, the final orbital inclination can be adjusted.

By way of example, the Space Shuttle, using a previous lightweight external tank constructed of 2219 aluminum alloy, is not able to reach the International Space Station at 51.6 degrees inclination (corresponding to a latitude including Moscow, Russia) unless payload is reduced by about 3,400 kg. By using Applicant's asymmetrical bulkheads, extra propellant alone, not including any weight savings due to reduction in structure of the external tank, would allow the Space Shuttle to carry an extra 1,800 kg of payload, helping to offset the loss. Likewise, a Space Shuttle using the current "super lightweight" external tank with Applicant's asymmetrical bulkhead, which weighs 3,400 kg less than the 2219 tank, and with Applicant's asymmetrical bulkhead, would be able to reach the International Space Station carrying an extra 1,800 kg of payload.

The three Space Shuttle main engines consume propellant at a nominal combined rate of about 3,900 liters per second. A modified external tank using Applicant's asymmetrical bulkheads and carrying the extra fuel enabled by the asymmetrical bulkheads allows about 9 seconds extra burntime.

However, rather than increasing the burntime, an increase in propellant flow rate could allow an upgrade of the shuttle engines. The next generation of Space Shuttle main engines may incorporate a larger throat for the main combustion chamber. This new chamber lowers engine operating pressures and temperatures while increasing the engine's operational safety margins. Despite the advantages of the new chamber, the engine delivers a lower specific impulse for the same thrust level. As such, every second of specific impulse lost reduces the payload capability by about 450 kilograms. As such, additional propellant carried as a result of Applicant's asymmetrical bulkheads offsets a loss of about 4 seconds of specific impulse. The additional propellant could increase the flowrate by 1.7 percent. The trade-off between the benefits of additional propellant is shown in Table 2.

TABLE 2

| Additional Propellant | Delta Payload Mass | Delta Altitude (km) | Inclination (deg) | Delta ISP (specific) |
|---|---|---|---|---|
| 13,800 (1.7% increase) | 1,800 | 0 | 28.5 | 0 |
| | 0 | 74 | 28.5 | 0 |
| | −1,600[1] | 0 | 51.6 | 0 |
| | 1,800[2] | 0 | 51.6 | 0 |
| | 0 | 0 | 28.5 | 4 |

[1]Indicates lightweight tank of 2219 aluminum
[2]Indicates super lightweight tank of aluminum lithium alloy The above external tank example, as shown in FIG. 5, is an adaptation of the external tank of the Space Shuttle to carry additional propellant. Another use of Applicant's asymmetrical bulkhead may be to fit a given tank volume within a limited space. Consider a cylindrical pressure vessel incorporated into a Space Shuttle payload with a requirement that the pressure vessel occupy no more than half of the cargo bay of the Space Shuttle. Here, more volume for the tank is available by using a vessel with Applicant's asymmetric bulkhead than a conventional vessel with a concave or convex bulkhead. In addition, such an asymmetric bulkhead eases integration of the pressure vessel into the payload bay by being more compact, and allows more available volume for other cargo. Other applications include new launch vehicles and spacecraft that can be optimized for volumetric packing efficiency in a minimum mass system. In yet other non-space flight related applications, ground systems, such as gas storage facilities, may benefit from minimizing the support structure. In even other applications, ground transportation systems such as commercial road and railroad tankers that may or may not require pressurization may benefit from a reduction of system size or mass. Likewise, unpressurized storage tanks for liquid and semi-liquid chemicals, such as municipal water tanks and tanks for storing dry powder or granules, such as grain storage facilities, may benefit through use of Applicant's asymmetrical bulkheads, particularly where space is at a preimum. In addition, component parts of pressure vessels and piping, such as closeouts and blank flanges, may also be designed with an optimal asymmetric shape.

Alternative geometric patterns may prove more advantageous for various design or cost constraints. Spherical caps used for both the concave and convex regions are one way to introduce common or existing parts into the structure. Whatever the ultimate contour, the entire bulkhead may be manufactured using existing fabrication techniques. Where necessary, the bulkhead may be reinforced locally with thicker material or other structural members such as ribs. In general, and as should be obvious to those skilled in the art, fabrication techniques for bulkheads and other curved tank structures may involve rolling flat stock between rollers of dissimilar size in order to contour portions of a bulkhead to a desired contour, and then welding the so-contoured portions together. In other instances, thin-walled tanks and bulkheads of a lightweight material may be wrapped or lapped with graphite thread or fabric (or other material) and bonded together with a resin that hardens over time so as to provide additional strength. In any case, it should be apparent that Applicant's proposed bulkhead structures may be fabricated and connected to tanks by any of many existing techniques.

Having thus described my invention and the manner of its use, it should be apparent to those skilled in the relevant arts that incidental changes may be made thereto that fairly fall within the scope of the following appended claims, wherein I claim:

1. A storage facility comprising:
    at least one container having one or more side walls, and
        at least one asymmetrical bulkhead attached to one end of said container adjacent said one or more side walls, said asymmetrical bulkhead comprising,
    a first region of said asymmetrical bulkhead extending outward beyond a volume of said container encompassed by said one or more side walls,
    a second region of said asymmetrical bulkhead extending into said volume of said container encompassed by said side walls,
    a transition region between said first region of said asymmetrical bulkhead and said second region of said asymmetrical bulkhead, said transition region integrally connecting said first region of said asymmetrical bulkhead and said second region of said asymmetrical bulkhead.

2. A storage facility as set forth in claim 1 wherein said first region is a generally convex region and said second region is a generally concave region, with said transition region oriented at an angle so as to connecting said generally concave region and said generally convex region.

3. A storage facility as set forth in claim 2 wherein said generally convex region and said generally concave region are each generally hemispherical.

4. A storage facility as set forth in claim 2 wherein said generally convex region and said generally concave region are each generally ellipsoidal.

5. A storage facility as set forth in claim 2 further comprising a second asymmetrical bulkhead at an opposite end of said container.

6. A storage facility as set forth in claim 2 further comprising at least two of said containers mounted in end-to-end relation, with a said generally convex region of one said container generally fitting into a said generally concave region of the other said container so that space between said at least two of said containers is minimized.

7. A storage facility as set forth in claim 6 wherein an interfacing region between said at least two of said containers is enclosed by an enclosure sized in accordance with said end-to-end relation.

8. A storage facility as set forth in claim 2 further comprising at least 2 of said containers mounted in end-to-end relation, with a said generally concave region of one of said containers being adjacent to a said concave region of the other of said containers to form a hollow volume between ends of said containers.

9. A storage facility as set forth in claim 8 further comprising a tank or other cargo mounted in said hollow region.

10. A storage facility as set forth in claim 2 wherein said transition region, in addition to being oriented at said angle, is curved in either a concave or convex direction.

11. A storage facility as set forth in claim 2 wherein a one of said generally concave region and said generally convex region is larger than the other of said generally concave region and said generally convex region.

12. A storage facility as set forth in claim 6 wherein said containers are pressurized containers.

13. A storage facility as set forth in claim 12 wherein said pressurized containers are fuel tanks for a spacecraft.

14. A storage facility as set forth in claim 12 further comprising a single, common said asymmetrical bulkhead for said two of said containers.

15. A pressure vessel for holding a pressurized liquid or semi-liquid material comprising:
    a generally cylindrical body having an axis and opposed ends,
    a bulkhead connected to each end of said opposed ends, one bulkhead for each said end, each said bulkhead further comprising:
        a convex region extending outward to an exterior of said cylindrical body,
        a concave region extending into an interior of said cylindrical body,
        a transition region angled to connect said convex region and said concave region to form a contiguous said bulkhead at each said end of said cylindrical body.

16. A pressure vessel as set forth in claim 15 further comprising a pair of said pressure vessels mounted in end-to-end relation, with a said convex region of one pressure vessel of said pressure vessels fitting into a said concave region of the other pressure vessel of said pressure vessels and a said convex region of said other of said pressure vessels fitting into said concave region of said one pressure vessel of said pressure vessels.

17. A pressure vessel as set forth in claim 16 wherein said concave region and said convex region of said pressure vessels are generally defined by the formula $$z(r,\theta) = A[\sin(\theta)*\sin(180+180*r/R)] + [a(r/R)^4 + b(r/R)^2 + C],$$

where $$A[\sin(\theta)*\sin(180+180*r/R)]$$

defines a sinusoidal pattern between said convex region and said concave region and $[a(r/R)^4 + b(r/R)^2 + C]$ may be used to define an additional convex curvature.

18. A pressure vessel as set forth in claim 16 further comprising an enclosing skirt around an interface between said pair of said pressure vessels.

19. A fuel tank assembly for holding liquid fuels powering a spacecraft, said fuel tank assembly comprising;
    a generally cylindrical propellant tank and a generally cylindrical oxidizer tank mounted in end-to-end relation at an interface between said propellant tank and said oxidizer tank,
    a first bulkhead in said interface region on said propellant tank fully enclosing an end of said propellant tank and a second bulkhead in said interface region on said oxidizer tank fully enclosing an end of said oxidizer tank, each of said first bulkhead and said second bulkhead configured having a convex region extending exterior of a respective said tank and a concave region extending into a respective said tank.

20. A fuel tank assembly as set forth in claim 19 wherein said convex region of one of said first bulkhead and said second bulkhead is closely fitted into said concave region of the other of said first bulkhead and said second bulkhead, thereby minimizing space of said interface region between said propellant tank and said oxidizer tank.

* * * * *